United States Patent [19]

Mills

[11] Patent Number: 4,693,117

[45] Date of Patent: Sep. 15, 1987

[54] REPLACEMENT ELEMENT FOR AT LIQUID LEVEL GAUGE SIGHT TUBE

[75] Inventor: Stephen K. Mills, Tulsa, Okla.

[73] Assignee: Kenco Engineering Company, Tulsa, Okla.

[21] Appl. No.: 775,804

[22] Filed: Sep. 13, 1985

[51] Int. Cl.$^4$ ............................................. G01F 23/02
[52] U.S. Cl. ........................................ 73/326; 73/328
[58] Field of Search ................. 73/325, 326, 328, 330, 73/334, 323, 333

[56] References Cited

U.S. PATENT DOCUMENTS

| | | | |
|---|---|---|---|
| 635,565 | 10/1899 | Mears | 73/326 |
| 657,329 | 9/1900 | Brooks | 73/326 |
| 743,178 | 11/1903 | Mears | 73/326 |
| 837,467 | 12/1906 | Halliday | 73/326 |
| 845,258 | 2/1907 | Price | 73/326 |
| 998,104 | 7/1911 | Leonhardt | 73/326 |
| 1,006,105 | 10/1911 | Leonhardt | 73/326 |
| 1,110,974 | 9/1914 | Buskirk et al. | 73/326 |
| 1,132,372 | 3/1915 | Mears | 73/326 |
| 1,157,708 | 10/1915 | McIntosh | 73/326 |
| 1,159,764 | 11/1915 | Heller | 73/326 |
| 1,227,196 | 5/1917 | Pocock | 73/333 |
| 1,239,304 | 9/1917 | Pocock | 73/326 |
| 2,533,490 | 12/1950 | McGrath et al. | 73/325 |
| 2,792,710 | 5/1957 | Lohr | 73/330 |

FOREIGN PATENT DOCUMENTS 18022 of 1896 United Kingdom ................ 73/326

Primary Examiner—Charles Frankfort
Assistant Examiner—Thomas B. Will
Attorney, Agent, or Firm—Head Johnson Stevenson

[57] ABSTRACT

A shielded tubular gauge for placement between two spaced apart fittings connected to a vessel to show the level of liquid in the vessel, including an elongated frame having a U-shaped cross-sectional configuration, a connection housing secured to each end of the frame and each having an opening therethrough, the opening being internally threaded in the outer portions thereof, a transparent tubular member received in the frame and in the housings openings, a packing nut received in the threaded opening in each of the housings, each of the packing nuts having a portion extending beyond the housing providing a cylindrical surface receivable in the fittings attached to the vessel, an elastomeric packing ring within each housing engaged by the packing nut and compressed against the exterior of the tubular member and a protective shield, such as of transparent material like polycarbonate or expanded metal, received in the frame providing protection for the tubular member.

4 Claims, 4 Drawing Figures

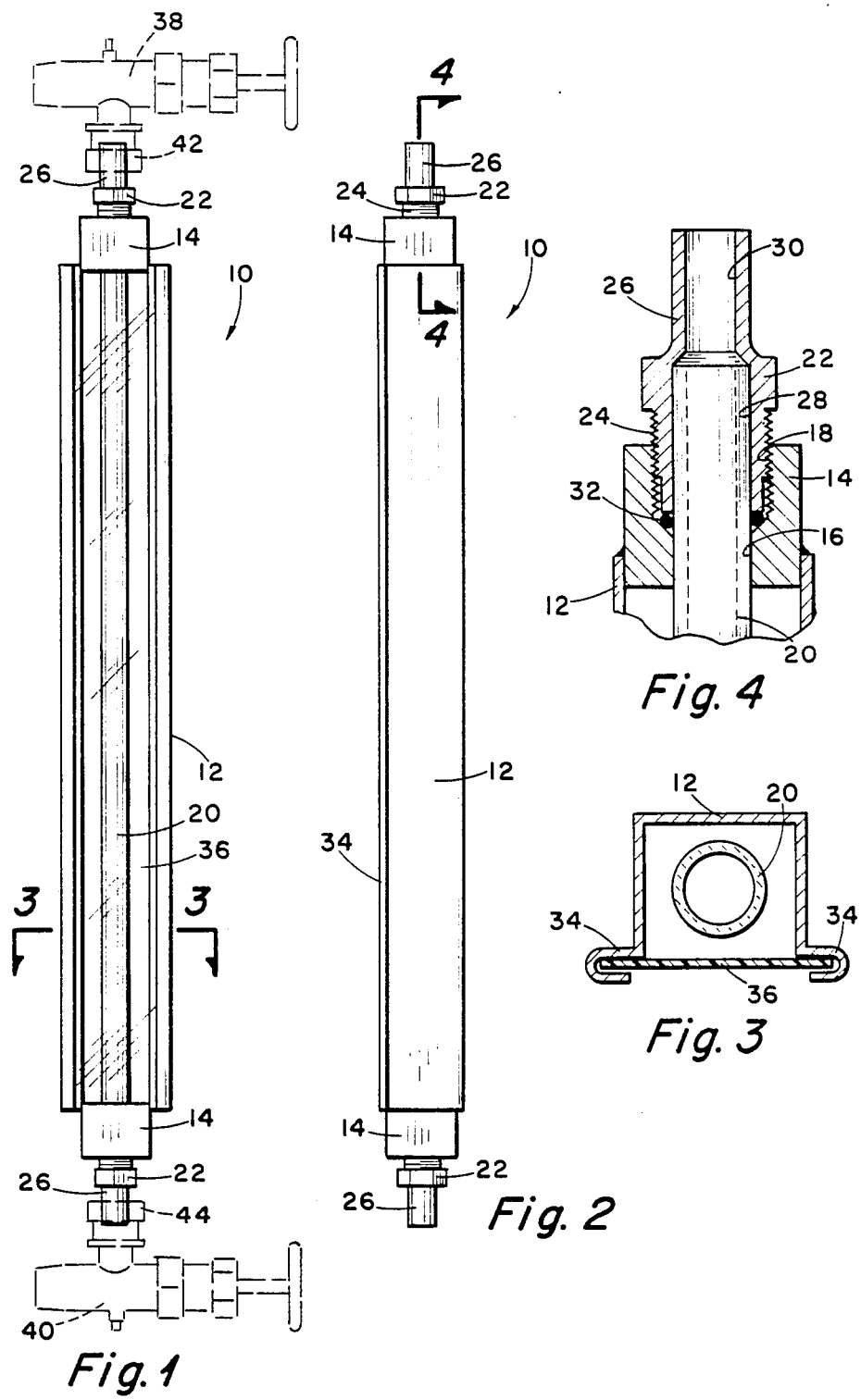

REPLACEMENT ELEMENT FOR AT LIQUID LEVEL GAUGE SIGHT TUBE

SUMMARY OF THE INVENTION

It has long been a practice to use an elongated tubular member, usually made of glass, connected with fittings at each end, to disclose the height of liquid in a vessel. This type of fluid level indication is successful because it is substantially foolproof, is inexpensive, and does not depend on any mechanical or electrical mechanism to indicate fluid level.

A problem with glass tube sight gauges is the danger of breakage. Since any elongated tube of transparent material is easily broken by inadvertent engagement by tools, broom handles, wind blown objects, etc., a constant danger exists that a breakage can result in a large spillage of the liquid content of the vessel and this becomes a particularly serious problem if the contents are hazardous, such as combustible materials.

The present invention is directed towards a means of providing a site glass gauge of greatly improved safety, while nevertheless providing one which is economical and easy to install and replace as necessary.

Others have provided protective sight glass gauges and for background material reference may be had to the following U.S. Pat. Nos. 1,225,604; 1,289,709; 1,193,368; 1,354,296; 1,434,645; 1,892,418; 2,149,100 and 2,629,262.

The present invention employs an elongated metal frame having a generally U-shaped cross-sectional configuration. A connection housing is secured to each end of the frame. Each connecting housing has an opening therethrough with the outer portion of the opening being internally threaded. The connection housings are secured to the frame with the openings in axial alignment and with the threaded portions extending opposite each other.

A transparent tubular member, such as of glass, is received in the frame and in the openings in each of the housings so that the tubular member is supported within the frame and between the housings.

A packing nut is provided for each connection housing. Each of the packing nuts has an externally threaded portion at one end which is threadably received in the packing housing, and the other end is cylindrical shaped and may be of the same diameter as the transparent tubular member or, is of a diameter typically employed for such tubular members.

A packing means, such as an O-ring, is received around the tubular member within each of the connection housings and is engaged by the packing nut so as to compressibly seal the tubular member in leak-proof connection with the packing nuts.

A protective member is secured to the frame. The protective member is preferably in the form of an elongated plate of transparent material or of expanded metal. If of transparent material it may preferably be of polycarbonate or other similar material to resist breakage.

The shielded tubular gauge can be inserted into fittings attached to a vessel in the same way that a bare glass sight tube is inserted since the tubular end portions of the packing nuts fit in such fittings in the same manner as the end portions of sight glasses.

The invention will be better understood with reference to the following description and claims, taken in conjunction with the attached drawings.

DESCRIPTION OF THE DRAWINGS

FIG. 1 is an elevational view of a shielded tubular gauge of this invention shown in position between fittings which may be attached such as to a vessel, the fittings being shown in dotted outline.

FIG. 2 is a side view of the shielded tubular gauge of FIG. 1.

FIG. 3 is a cross-sectional view taken along the line 3—3 of FIG. 1

FIG. 4 is a fragmentary cross-sectional view taken along the line 4—4 of FIG. 2.

DESCRIPTION OF A PREFERRED EMBODIMENT

Referring to the drawing and first to FIGS. 1 and 2, an embodiment of the invention is shown, the shielded tubular gauge being generally indicated by the numeral 10. The gauge includes an elongated structural frame 12 which is preferably formed of sheet metal, such as steel. As best illustrated in FIG. 3, the frame 12 is of generally U-shaped cross-sectional configuration forming a back and two sides and with an open front. Secured to the upper and lower ends of the frame is a connection housing 14. Each of the housings 14 may be affixed to frame 12 such as by welding, as illustrated in FIG. 4, which shows one of the housings in cross-section. Each housing 12 includes an opening 16 therethrough, the outer portion of which is internally threaded at 18.

Received within the frame 12 is an elongated transparent tubular member 20 which is typically made of glass or other transparent material including plastic, however, glass is preferred because of its high degree of transparency, dimensional stability, and inertness. The opening 16 in each of the connection housings 14 is such as to freely slidably receive the tubular member 20. Two packing nuts 22 are employed. Each packing nut has external threads 24 on one end and a tubular member with a smooth cylindrical external surface 26 at the other end. Each packing nut has an opening 28 therethrough, the inner portion of the opening being of a diameter to slidably receive tubular member 20, and the opening 30 through the tubular portion 26 being of reduced internal diameter.

Positioned within each connection housing 14 is an elastomeric seal, such as an O-ring 32 received about the exterior of tubular member 20. The O-ring is engaged by the inner end of the packing nut received in each of the connection housings so as to compress it into sealed engagement with the exterior of the tubular member.

As seen best in FIG. 3, the frame 12, which has been described as being of generally U-shaped cross-sectional configuration, also preferably includes integral, spaced apart, U-shaped portions 34 at the open ends of the U-shaped frame. The U-shaped integral portions 34 face each other and slidably receive an elongated protective plate 36. The plate 36 may be of transparent material as shown in FIGS. 1 and 3, or the plate may be of expanded metal. The function of plate 36 is to expose visually the tubular member 20 but to protect it against physical damage in conjunction with the frame 12. By means of plate 36 and frame 12, the tubular member is completely surrounded on all sides. Plate 36 can be slid into and out of the U-shaped portions 34 and is held in place by friction. Where the plate 36 is transparent it is preferably material which offers resistance against breakage, such as polycarbonate.

APPLICATION OF THE INVENTION

The shielded tubular gauge 10 as illustrated and described may be used directly in place of an existing glass sight tube. FIG. 1 shows in dotted outline fittings 38 and 40 of the type such as would be attached to and extended from the wall of a vessel. Compression fittings 42 and 44 normally serve to sealably retain a transparent tubular member therebetween. Since the packing nuts 22 provide tubular portions 26 of a diameter corresponding to a glass sight tube, the shielded tubular gauge of this invention may be inserted directly into compression fittings 42 and 44 without the necessity of removing the valves 38 and 40 from the vessel. To accomplish this, fittings 42 and 44 are loosened. One of the tubular portions 26, such as the upper one, is fully inserted into the opened compression fitting 42. This allows the lowermost fitting 26 to be moved into position and the shielded tubular gauge lowered so that the upper and lower tubular portions 26 both then extend within the compression fittings 42 and 44. The compression fittings may then be tightened and the gauges are installed.

The shielded tubular gauge provides a high degree of safety against inadvertent compact by physical object, and yet the tubular gauge is freely visible. The gauge can be easily cleaned by removing it. A tube brush can be inserted into the interior of the packing nuts and thence into the tubular member 20 to clean it just as is employed in cleaning the standard tubular glass. The slidable front plate 36 can be removed without removal of the entire assembly for purposes of cleaning the protective frame and the plate inself. The elastomeric gromet or O-ring 32 serves to secure the tubular member against leakage and at the same time shields it against breakage in the event the frame is struck.

An important feature of the present invention, which feature has been heretofore referred to but which deserves more emphasis, is that the shielded gauge can be readily employed in the place of an existing glass gauge. This unique feature is achieved by the arrangement in which both end structures of the shielded gauge are formed by the metallic tubular portions 26 of the packing nuts 22. These cylindrical end portions 26 are of the same diameter as a standard sight glass. Thus, for the many sight glass gauges in current use in industry today the shielded gauge of this invention can be inserted without requiring modification to the vessel or even to the valve structure at the top and bottom of such existing glass gauges. The existing glass can be removed and the shielded gauge immediately inserted in its place by the method heretobefore described. The ability to replace a standard glass gauge, with its inherent safety problems, with the shielded gauge of this invention, without the expense of modifying the vessel with which the gauge is used, means that the operator has available to him an opportunity to upgrade his safety standards at a very minimal expense.

While the invention has been described with a certain degree of particularly it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A shielded tubular gauge for placement between two spaced apart compression type fittings connected to a vessel or the like so as to show a liquid level, comprising:

a single elongated vertical sheet metal structural frame of single thickness throughout its expanse, the frame having an upper end and a lower end, the sheet metal frame being bent into a generally square cross-sectional channel configuration and being open on one side and closed on three sides, the open side providing spaced-apart vertical edges, each edge being bent into a U-shaped cross-sectional shape, the open ends thereof facing each other;

a first connection housing secured to said upper end of said frame and a second connection housing secured to said lower end of said frame, each housing having an opening therethrough, each opening having a portion which is internally threaded, the housings being secured to said frame with said openings in axial alignment and with the threaded portions extending opposite each other;

a transparent tubular member received in said frame and said housing openings;

two packing members, each having an opening therethrough and each having an external threaded portion at one end and an external cylindrical surface at the other end, each of said threaded portions being receivable in a respective one of said connection housing threaded openings, and when so positioned, snuggly receiving an end portion of said transparent member;

packing means within each of said connection housings surrounding the end portion of said transparent member and engaged by said packing member for sealably closing said transparent member and said packing members; and an elongate sheet of protective material slideably received in said U-shaped portions of said frame vertical edges, said tubular member being visible through said sheet of protective material whereby said transparent tubular member is protectively surrounded on all sides and the shielded tubular gauge may directly replace a standard tubular sight glass having an outside diameter substantially the same as the outside diameter of said packing members external cylindrical surfaces.

2. A shielded tubular gauge according to claim 1 wherein said elongate sheet of protective material is an elongated plate of transparent material.

3. A shielded tubular gauge according to claim 2 wherein said elongated plate of transparent material is formed of polycarbonate.

4. A shielded tubular gauge according to claim 1 wherein said elongated sheet of protection material is formed of expanded metal.

* * * * *